United States Patent
Thomson

(10) Patent No.: US 12,266,366 B2
(45) Date of Patent: *Apr. 1, 2025

(54) TRANSCRIPTION GENERATION TECHNIQUE SELECTION

(71) Applicant: Sorenson IP Holdings, LLC, Salt Lake City, UT (US)

(72) Inventor: David Thomson, Bountiful, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,184

(22) Filed: Aug. 28, 2023

(65) Prior Publication Data

US 2023/0410815 A1 Dec. 21, 2023

Related U.S. Application Data

(63) Continuation of application No. 16/885,039, filed on May 27, 2020, now Pat. No. 11,741,964.

(51) Int. Cl.
| | | |
|---|---|---|
| *G10L 15/22* | (2006.01) | |
| *G06F 18/21* | (2023.01) | |
| *G10L 15/26* | (2006.01) | |
| *G10L 15/30* | (2013.01) | |
| *G10L 21/10* | (2013.01) | |

(52) U.S. Cl.
CPC .......... *G10L 15/26* (2013.01); *G06F 18/2178* (2023.01); *G10L 15/30* (2013.01); *G10L 21/10* (2013.01)

(58) Field of Classification Search
None
See application file for complete search history.

(56) References Cited

U.S. PATENT DOCUMENTS

| | | |
|---|---|---|
| 5,875,436 A | 2/1999 | Kikinis |
| 6,185,535 B1 * | 2/2001 | Hedin ............... G10L 15/30 704/E15.047 |
| 7,228,275 B1 | 6/2007 | Endo et al. |
| 7,908,145 B2 | 3/2011 | Bennett et al. |
| 8,682,672 B1 | 3/2014 | Ha et al. |
| 9,318,110 B2 * | 4/2016 | Roe ............... G10L 15/26 |
| 9,443,518 B1 * | 9/2016 | Gauci ............. G06F 40/169 |

(Continued)

OTHER PUBLICATIONS

InnoCaption, ASR Development Update, Feb. 27, 2020 and Mar. 2, 2020.

*Primary Examiner* — Neeraj Sharma
(74) *Attorney, Agent, or Firm* — Maschoff Brennan

(57) ABSTRACT

A method to transcribe communications may include selecting a first transcription generation technique from among multiple transcription generation techniques for generating transcriptions of audio of one or more communication sessions that involve a user device and obtaining performances of the multiple transcription generation techniques with respect to generating the transcriptions of the audio. The method may also include monitoring comparisons between the performances of the multiple transcription generation techniques and obtaining input from the user with respect to the comparisons. The method may further include selecting a second transcription generation technique from among the multiple transcription generation techniques based on the input from the user.

20 Claims, 5 Drawing Sheets

(56) References Cited

U.S. PATENT DOCUMENTS

| | | | |
|---|---|---|---|
| 9,497,315 B1* | 11/2016 | Pakidko | H04W 4/80 |
| 9,704,111 B1* | 7/2017 | Antunes | G06F 40/106 |
| 9,715,876 B2* | 7/2017 | Hager | H04L 51/066 |
| 9,736,309 B1* | 8/2017 | Bentitou | H04M 3/527 |
| 9,773,501 B1* | 9/2017 | Brooksby | G10L 15/26 |
| 9,967,380 B2 | 5/2018 | Engelke et al. | |
| 10,224,057 B1 | 3/2019 | Chevrier | |
| 10,389,876 B2 | 8/2019 | Engelke et al. | |
| 10,542,141 B2 | 1/2020 | Engelke et al. | |
| 10,917,519 B2 | 2/2021 | Engelke et al. | |
| 10,971,157 B2* | 4/2021 | Willett | G10L 15/1815 |
| 11,315,569 B1 | 4/2022 | Talieh et al. | |
| 11,620,566 B1 | 4/2023 | Shevchenko et al. | |
| 2001/0005825 A1 | 6/2001 | Engelke et al. | |
| 2006/0149558 A1 | 7/2006 | Kahn et al. | |
| 2011/0054892 A1* | 3/2011 | Jung | G10L 15/08 704/254 |
| 2012/0221321 A1* | 8/2012 | Nakamura | G10L 15/32 704/E13.001 |
| 2013/0066630 A1* | 3/2013 | Roe | G10L 15/26 704/235 |
| 2015/0073790 A1* | 3/2015 | Steuble | G10L 15/26 704/235 |
| 2015/0340036 A1 | 11/2015 | Weeks | |
| 2017/0201613 A1 | 7/2017 | Engelke et al. | |
| 2017/0206808 A1 | 7/2017 | Engelke et al. | |
| 2017/0206888 A1 | 7/2017 | Engelke et al. | |
| 2017/0206914 A1 | 7/2017 | Engelke et al. | |
| 2017/0208172 A1 | 7/2017 | Engelke et al. | |
| 2018/0034961 A1 | 2/2018 | Engelke et al. | |
| 2018/0270350 A1 | 9/2018 | Engelke et al. | |
| 2018/0285059 A1 | 10/2018 | Zurek et al. | |
| 2019/0037072 A1 | 1/2019 | Engelke et al. | |
| 2019/0312973 A1 | 10/2019 | Engelke et al. | |
| 2019/0333517 A1 | 10/2019 | Nelson | |
| 2020/0007679 A1 | 1/2020 | Engelke et al. | |
| 2020/0075013 A1 | 3/2020 | Holm | |
| 2020/0153957 A1 | 5/2020 | Engelke et al. | |
| 2020/0153958 A1 | 5/2020 | Engelke et al. | |
| 2020/0243094 A1* | 7/2020 | Thomson | G10L 15/28 |
| 2020/0244800 A1 | 7/2020 | Engelke et al. | |
| 2020/0252507 A1 | 8/2020 | Engelke et al. | |
| 2020/0394258 A1 | 12/2020 | Chen et al. | |
| 2021/0056950 A1 | 2/2021 | Niehaus et al. | |
| 2021/0224695 A1 | 7/2021 | Stefanov et al. | |
| 2021/0295826 A1 | 9/2021 | Morabia et al. | |

\* cited by examiner

TRANSCRIPTION GENERATION TECHNIQUE SELECTION

CROSS-REFERENCE TO RELATED APPLICATION

This application is a continuation of U.S. patent application Ser. No. 16/885,039, filed on May 27, 2020, the disclosure of which is incorporated herein by reference in its entirety.

FIELD

The embodiments discussed in the present disclosure are related to selection of a transcription generation technique.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, a method to transcribe communications may include selecting a first transcription generation technique from among multiple transcription generation techniques for generating transcriptions of audio of one or more communication sessions that involve a user device and obtaining performances of the multiple transcription generation techniques with respect to generating the transcriptions of the audio. The method may also include monitoring comparisons between the performances of the multiple transcription generation techniques and obtaining input from the user with respect to the comparisons. The method may further include selecting a second transcription generation technique from among the multiple transcription generation techniques based on the input from the user.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

In some embodiments, different techniques of transcription generation may be used to generate a transcription of the audio. For example, a particular transcription generation technique may be initially selected from among the different transcription generation techniques.

In some embodiments, a system may change the transcription generation technique. For example, in some instances, performances of the transcription generation techniques with respect to generating transcriptions of audio may be obtained. Based on the performances of the transcription generation techniques, a suggested transcription generation technique may be provided to a user. An input from the user in response to the suggested transcription generation technique may be obtained. Based on the input from the user, a transcription generation technique other than the transcription generation technique initially selected may be used.

The systems and methods to select between different transcription generation techniques described in this disclosure may result in the improved display of transcriptions at a user device. For example, the systems and methods described in this disclosure may provide users with improved user experiences by selecting transcription generation techniques based on performances of the transcription generation techniques and the user input.

Figure 1:
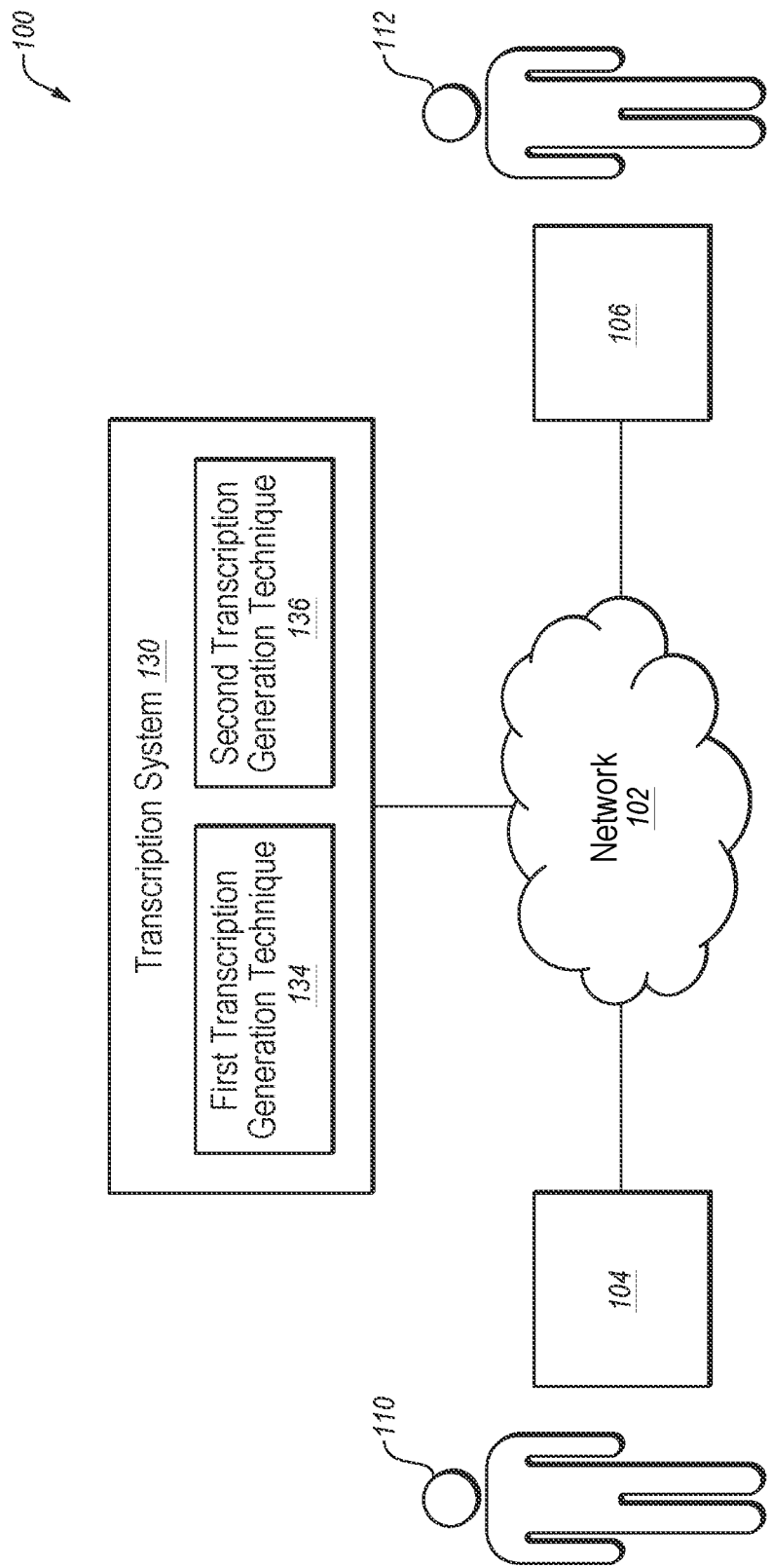
FIG. 1 illustrates an example environment for transcription of communications.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 130. The transcription system 130 may operate to generate a transcription using a first transcription generation technique 134 and/or a second transcription generation technique 136.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations, including multiple different types of networks, network connections, and protocols to communicatively couple devices and systems in the environment 100. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device that may be used for communication between the first user 110 of the first device 104 and the second user 112 of second device 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate with the network 102 over a wireless cellular network, a wired Ethernet network, a wireless 802.11 network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Also, as used in this disclosure, the term video may be used generically to refer to a compilation of images that may be reproduced in a sequence to produce video.

As an example of obtaining audio, the first device 104 may be configured to obtain first audio from the first user 110. For example, the first device 104 may obtain the first audio from a microphone of the first device 104 or from another device that is communicatively coupled to the first device 104.

The second device 106 may also be configured to obtain second audio from a second user 112. In some embodiments, the second device 106 may obtain the second audio from a microphone of the second device 106 or from another device communicatively coupled to the second device 106. During the communication session, the first device 104 may provide the first audio for the second device 106. Alternatively or additionally, the second device 106 may provide the second audio for the first device 104. One or both of the first device 104 and the second device 106 may be configured to provide the first audio, the second audio, or both the first audio and the second audio to the transcription system 130.

In some embodiments, the transcription system 130 may be configured to generate a transcription of the audio received from either one or both of the first device 104 and the second device 106. The transcription system 130 may also provide the generated transcription of the audio to either one or both of the first device 104 and the second device 106. Either one or both of the first device 104 and the second device 106 may be configured to present the transcription received from the transcription system 130. For example, the first device 104 may be configured to display the received transcriptions on a display that is part of the first device 104 or that is communicatively coupled to the first device 104. With respect to FIG. 1, the disclosure may discuss obtaining information and presenting transcriptions to the first device 104 and/or the first user 110 for easy in explanation. However, any description of obtaining information and presenting transcriptions may be apply to both the first device 104 and the second device 106 unless otherwise specified.

The transcription system 130 may be configured to generate a transcription of audio using the first transcription generation technique 134 or the second transcription generation technique 136. In some embodiments, the transcription system 130 may include any configuration of hardware, such as processors, servers, and database servers that are networked together and configured to perform a task. For example, the transcription system 130 may include one or multiple computing systems, such as multiple servers that each include memory and at least one processor.

The first transcription generation technique 134 and the second transcription generation technique 136 may each be configured to generate transcriptions from audio. In these and other embodiments, both the first transcription generation technique 134 and the second transcription generation technique 136 may be configured to recognize speech in the audio. Based on the recognized speech, the first transcription generation technique 134 and the second transcription generation technique 136 may output a transcription of the speech. The transcription may be a written version of the speech in the audio.

In general, a transcription generation technique may include the processes, techniques, systems, and/or data, such as a model used in an automatic transcription system, that may be used to generate transcriptions from audio. Thus a change in of a process, technique, system, and/or data used to generate transcriptions from audio may be referred to as a different transcription generation technique.

For example, in some embodiments, the first transcription generation technique 134 and the second transcription generation technique 136 may be generated by the same system, that follows the same processes and techniques, but applies different data. For example, the first transcription generation technique 134 may use a first set of models, such as an acoustic model and/or language model, and the second transcription generation technique 136 may use a second set of models. Alternately or additionally, an amount of resources used by each of the first transcription generation technique 134 and the second transcription generation technique 136 may be different, which may affect a speed of the first transcription generation technique 134 and the second transcription generation technique 136.

As another example, the first and second transcription generation techniques 134 and 136 may be performed by different speech recognition systems. For example, the first and second transcription generation techniques 134 and 136 may be performed by different third-party systems. In these and other embodiments, the third-party systems may be fully machine based automatic speech recognition (ASR) systems. Fully machine-based ASR systems may operate without human intervention and may be referred to in this disclosure as automatic transcription systems.

As another example, the first transcription generation technique 134 may be generated using an automatic transcription system and the second transcription generation technique 136 may be generated using a revoicing transcription system, referred to in this disclosure as revoicing transcription system. The revoicing transcription system may receive and broadcast audio to a participant (e.g., a human captioning agent). The participant may listen to the broadcast and speak the words from the broadcast. The words spoken by the participant are captured to generate revoiced audio. The revoiced audio may be used by a speech recognition program to generate the transcription of the audio.

As another example, the first transcription generation technique 134 may be a fusion of the output of two or more transcriptions generated by automatic transcription systems and/or revoicing transcription systems and the second transcription generation technique 136 may be a transcription from a single automatic transcription system and/or revoicing transcription system or fusion of the output of two or more transcriptions generated by a different combination of automatic transcription systems and/or revoicing transcription systems.

The transcription system 130 may be configured to select between the first transcription generation technique 134 and the second transcription generation technique 136 based on input from one or more of the first user 110 and the second user 112. In some embodiments, the transcription system 130 may select an initial one of the first and second transcription generation techniques 134 and 136. The initial one of the first and second transcription generation techniques 134 and 136 may be selected based on one or more factors that may be further discussed with respect to FIG. 2. For ease of explanation, the first transcription generation technique 134 may be discussed with respect to FIG. 1 as the selected one of the first and second transcription generation techniques 134 and 136. However, either one of the first and second transcription generation techniques 134 and 136 may be the selected one of the first and second transcription generation techniques 134 and 136.

The first transcription generation technique 134 may be used by the transcription system 130 to generate transcriptions for presentation to the first user 110 as described with respect to FIG. 1. In some embodiments, the transcription system 130 may also be configured to obtain a performance of the first transcription generation technique 134. In these and other embodiments, the transcription system 130 may also be configured to obtain a performance of the non-selected second transcription generation technique 136.

The performance of the first and second transcription generation techniques 134 and 136 may be an indication of accuracy, latency, correction rate, and/or quick words reliability. The accuracy may be an estimated accuracy and may indicate how accurately the transcription of audio depicts the words in the audio. For example, it may be determined by adding the number of inserted words, deleted words, and substituted words, then dividing the total by the number of words spoken. The latency may indicate a length of a time period between when a word from audio is broadcast to a user and when the corresponding word from a transcription of the audio is presented to the user. The correction rate may indicate how many of the words after being presented to the user are subsequently corrected and an updated corrected word is presented to the user. A correction may be made when a speech recognizer generates a transcription for an audio signal at a first point in time, then changes the transcription at a second point in time. The change may be triggered by the speech recognizer performing additional processing on the audio signal and/or by processing additional audio that provides additional context into what was said previously. Additionally or alternatively, a correction may be made when a human changes a transcription previously generated. The quick words reliability may indicate how reliable or accurately a quick word is inserted into the text. For example, if three quickwords "(new speaker)," "(background speech)," and "(beeping)" are correctly inserted into the transcription, but "(busy signal)" is incorrected omitted, the quick word reliability may be determined to be ¾ or 75%.

In some embodiments, the performance of the first transcription generation technique 134 may be obtained based on a current communication session, one or more previous communication sessions, and/or other information about the first user 110 and the second user 112. In some embodiments, the performance of the first transcription generation technique 134 may be an estimated performance.

In some embodiments, the performance of the second transcription generation technique 136 may be an estimated performance. For example, the second transcription generation technique 136 may not be generating transcriptions for presentation by the first device 104 to the first user 110. However, based on information regarding the audio, the first device 104, the first user 110, and/or previous performance of the second transcription generation technique 136, a performance of the second transcription generation technique 136 may be determined.

In some embodiments, the transcription system 130 may be configured to monitor comparisons between the performance of the first transcription generation technique 134 and the performance of the second transcription generation technique 136. In response to the comparison between the performances of the first and second transcription generation techniques 134 and 136 satisfying a threshold, the transcription system 130 may generate a report for presentation to the first user 110.

In some embodiments, the report may include information regarding one or both of the first and second transcription generation techniques 134 and 136. For example, the report may include information regarding the performance of one or both of the first and second transcription generation techniques 134 and 136. The report may also be configured to solicit a response from the first user 110. The response from the first user 110 may be a selection of the one of the first and second transcription generation techniques 134 and 136. In some embodiments, the report may suggest, state, or otherwise indicate that selection of the second transcription generation technique 136 may be beneficial to the first user 110. Alternately or additionally, the report may suggest, state, or otherwise indicate to the first user 110 to select the second transcription generation technique 136.

In some embodiments, the report may be directed to the first user 110. For example, the report may be provided to the first device 104. Alternately or additionally, the report may be provided to another device or communication address of the first user 110. Alternately or additionally, the report may be provided verbally to the first user 110.

In some embodiments, the transcription system 130 may obtain input from the first user 110. For example, the first user 110 may interact with the first device 104, such that the first device 104 obtains the input from the first user 110. The first device 104 may provide the input to the transcription system 130. In these and other embodiments, the input may be an indication of a selection by the first user 110 of the second transcription generation technique 136. The selection may be based on the performances of the first and second transcription generation techniques 134 and 136 and/or the comparison of the performances of the first and second transcription generation techniques 134 and 136.

In some embodiments, in response to and based on the input from the first user 110, the transcription system 130 may select the second transcription generation technique 136 to generate transcriptions for presentation to the first user 110. In some embodiments, the transcription system 130 may select the second transcription generation technique 136 to generate transcriptions during an ongoing communication session. Alternately or additionally, the transcription system 130 may select the second transcription generation technique 136 to generate transcriptions for future communication sessions.

An example of the operation of the environment 100 is now provided. The transcription system 130 may select the first transcription generation technique 134 based on initial input from the first user 110. For example, when the first user 110 begins using the services from the transcription system 130, the first user 110 may select the first transcription generation technique 134. During multiple communication sessions over a period of time, the transcription system 130 may track an accuracy of the first transcription generation technique 134. The transcription system 130 may also track an accuracy of the second transcription generation technique 136 with respect to other users that may or may not include the first user 110. The transcription system 130 may compare the accuracy of the first and second transcription generation techniques 134 and 136. In response to the accuracy of the second transcription generation technique 136 being greater than the accuracy of the first transcription generation technique 134, the transcription system 130 may generate a report that indicates the accuracy of the first transcription generation technique 134 and the accuracy of the second transcription generation technique 136. The report may also suggest selection of the second transcription generation technique 136 based on the higher accuracy of the second transcription generation technique 136.

The report may be provided to the first device 104 and presented to the first user 110. The first device 104 may also provide an interface for the first user 110 to select the second transcription generation technique 136. In response to an input from the first user 110 selecting the second transcription generation technique 136, the first device 104 may indicate the selection of the second transcription generation technique 136 to the transcription system 130. The transcription system 130 may use the second transcription generation technique 136 to generate transcriptions for presentation to the first user 110 in response to and based on the input of the first user 110.

In the above example, the performance of the first transcription generation technique 134 and the second transcription generation technique 136 are compared over multiple communication sessions. However, in the environment 100, the performance of the first transcription generation technique 134 and the second transcription generation technique 136 may be compared on a per communication session basis. As such, during a communication session, the performance of the first transcription generation technique 134 may be compared to the performance of the second transcription generation technique 136. A report may be generated and presented to the first user 110 during the communication session. The input of the first user 110 may be obtained during the communication session and in response to and based on the input, the transcription system 130 may use the second transcription generation technique 136 to generate transcriptions for a remaining portion of the communication session. Thus, the transcription generation technique may change during a single communication session based on a performance comparison and input from a user.

Modifications, additions, or omissions may be made to the environment 100 without departing from the scope of the present disclosure. For example, in some embodiments, the environment 100 may include additional devices. In these and other embodiments, the additional devices may be configured to present transcriptions, present a report, obtain user input, present audio, capture audio, among other functions described with respect to the first device 104.

As another example, in some embodiments, the components of the transcription system 130 may be coupled over a network. For example, a first speech recognition system that performs the first transcription generation technique 134 may be coupled with other components of the transcription system 130 over a network.

As another example, the transcription system 130 may include any number of transcription generation techniques. In these and other embodiments, the transcription system 130 may obtain performance of each of the multiple transcription generation techniques, compare the performances, and generate a report based on the performances and comparisons. In these and other embodiments, the transcription system 130 may select a different transcription generation technique based on input from the user.

Further, the locations of certain operations being described as being performed are given as examples and not limiting. For example, in some embodiments, the first device 104 and/or the second device 106 may be configured to perform one or more operations related to selection of a transcription generation technique. Alternately or additionally, one or more of the first device 104 and/or the second device 106 may be configured to perform one of the first transcription generation technique 134 and the second transcription generation technique 136.

In addition, in some embodiments, different transcription generation techniques may be used for communication sessions that may be conducted on the same device. For example, in some instances the first user 110 and a third user may both use the first device 104 to conduct communication sessions. In these and other embodiments, the first transcription generation technique 134 may be selected for the first user 110 and the second transcription generation technique 136 may be selected for the third user. In these or other embodiments, when the first user 110 is participating in a communication session using the first device 104, the transcriptions presented by the first device 104 may be obtained using the first transcription generation technique 134. Additionally or alternatively, when the third user is participating in a communication session using the first device 104, the transcriptions presented by the first device 104 may be obtained using the second transcription generation technique 136.

As another example, the selected transcription generation technique may be associated with a participant in a communication session. As such, different transcription generation techniques may be used for different participants. For example, when a communication session occurs that includes a device, such as the second device 106 that is associated with the second user 112, the transcription system 130 may select the first transcription generation technique 134 based on user input regarding the communication sessions with devices associate with the second user 112. When a communication session occurs that includes a device associated with a third user, the transcription system 130 may select the second transcription generation technique 136 based on user input. In these and other embodiments, a report regarding a particular user may be provided to the first user 110. A selection by the first user 110 may be used to select a different transcription generation technique for future communications with the particular user but may not affect the transcription generation techniques that may be used for communication sessions with other users. In these and other embodiments, the identity of the other user in a communication session to select the corresponding transcription generation technique may be determined using any type of process. For example, a process to determine the identity may include a login process, such as where the user provides a user name or number and/or password by voice, button input, or touch screen input; facial recognition; voice recognition; fingerprint recognition; iris recognition, other biometric recognition; detection of the calling number (ANI) or dialed number (DNIS), among other processes for determining identity.

Figure 2:
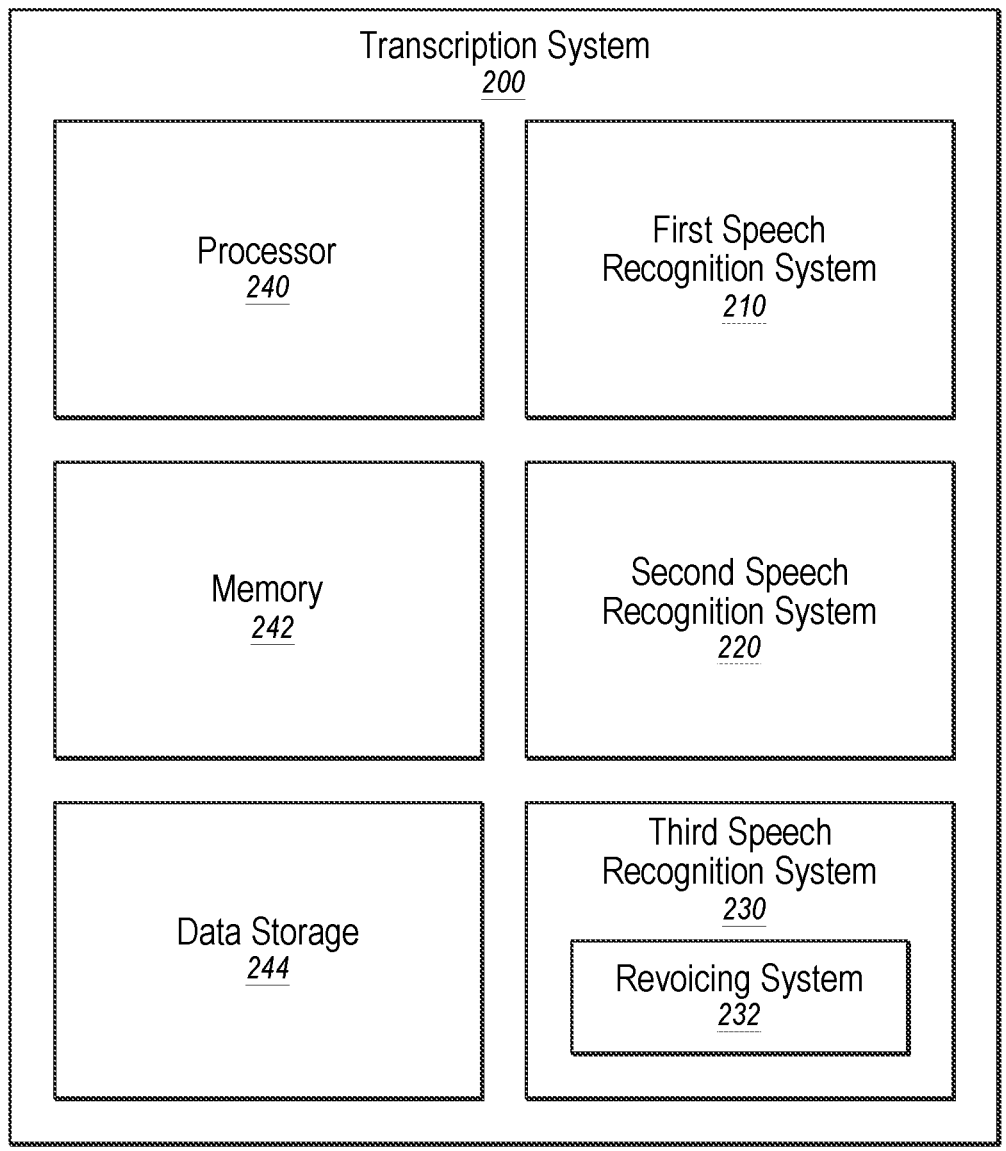
FIG. 2 illustrates an example transcription system.

FIG. 2 illustrates an example transcription system 200 for transcription of communications. The transcription system 200 may be arranged in accordance with at least one embodiment described in the present disclosure. The transcription system 200 may include a first speech recognition system 210, a second speech recognition system 220, a third speech recognition system 230 that includes a revoicing system 232, a processor 240, a memory 242, and a data storage 244.

The transcription system 200 may be configured to operate in a manner similar to the transcription system 130 of FIG. 1. The first speech recognition system 210, the second speech recognition system 220, and the third speech recognition system 230 may be configured to generate transcriptions from audio. The first speech recognition system 210 and the second speech recognition system 220 may be automatic transcription systems. As an example, the first speech recognition system 210 may be a third-party ASR system, such as an ASR system hosted in a cloud and accessible by multiple parties.

In some embodiments, the second speech recognition system 220 may include a system particular to the transcription system 200. In these and other embodiments, the second speech recognition system 220 may include one or more models, such as acoustic models, language models, and other models that may be used in an ASR system. Use of different combinations of the models may be considered different transcription generation techniques. Alternately or additionally, an amount of processing resources, a speed of a transcription, and other variables may be adjusted within the second speech recognition system 220. Each adjustment may result in a different transcription generation technique.

The third speech recognition system 230 may be a revoicing transcription system. The revoicing system 232 of the third speech recognition system 230 may include systems to broadcast audio and capture audio. For example, the third speech recognition system 230 may include speakers and microphones that are configured to broadcast audio to multiple participant and capture voices of the participants that includes the words of the broadcast audio. The third speech recognition system 230 may include individual ASR systems that are trained with respect to the voice of the participants. Use of different participants to revoice the audio may be considered a separate transcription generation technique. In some embodiments, the transcription system 200 may store data in the data storage 244 regarding each of the participants, including an accuracy and other information.

In some embodiments, the transcription system 200 may combine one or more of the transcriptions of the first speech recognition system 210, the second speech recognition system 220, and/or the third speech recognition system 230. Each possible combination of the transcriptions may be considered a unique transcription generation technique.

The processor 240 may be one or more processors that are distributed across one or more devices, such as one or more servers and/or locations that are configured to perform individually or collectively any number of operations described herein. The processor 240 may interpret and/or execute program instructions and/or process data stored in the memory 242. In some embodiments, the processor 240 may be configured in a manner described with respect to the processor 510 of FIG. 5.

The memory 242 may include computer-readable storage media or one or more computer-readable storage mediums for carrying or having computer-executable instructions or data structures stored thereon that are distributed across one or more devices, such as one or more servers and/or locations.

The data storage 244 may include computer-readable storage media or one or more computer-readable storage mediums for carrying or having computer-executable instructions or data structures stored thereon that are distributed across one or more devices, such as one or more servers and/or locations. The computer-executable instructions stored in the data storage 244 may be loaded into the memory 242 and then executed by the processor 240. With respect to FIG. 2, when data is referred to as being stored, collected, or otherwise obtained, the data may be stored in, collected from, and/or obtained from the data storage 244.

The transcription system 200 may be configured to select a speech recognition system and a transcription generation technique of the selected speech recognition system in response to a start of a communication session at a device associated with a user. The transcription system 200 may select the speech recognition system and the transcription generation technique based on previously system and technique selected for a previous communication session, based on the other participant in the communication session as identified by an identifier of the participant, such as a phone number, based on a particular setting associated with the user, or using other methods as described in U.S. patent application Ser. No. 16/209,623, filed on Dec. 4, 2018, entitled "Transcription Generation from Multiple Speech Recognition Systems," which application in incorporated in this disclosure in its entirety. Methods described in patent Ser. No. 16/209,623 may also be used in combination with other methods described herein, for example to estimate or predict accuracy, generate transcriptions, combine outputs of multiple speech recognition systems, and switch between speech recognition systems.

In some embodiments, the transcription system 200 may be configured to obtain a performance of the selected speech recognition system and transcription generation technique. The transcription system 200 may also be configured to obtain a performance of one or more other speech recognition systems and transcription generation techniques. The performance may be an accuracy of transcriptions of audio generated by the user, accuracy transcriptions of audio generated by another party in the communication session, latency, correction rate, and/or quick words reliability.

In some embodiments, the transcription system 200 may obtain the performance, such as by measuring one or more of: the accuracy, the latency, and/or the correction rate, over varying time periods. For example, the transcription system 200 may obtain the performance over a particular number of previous communication sessions or over all previous communication sessions. Alternately or additionally, the transcription system 200 may obtain the performance based on the current communication session or some portion of the current communication session. Alternately or additionally, the transcription system 200 may obtain the performance with respect to the other participant in the communication session. In these and other embodiments, the transcription system 200 may obtain the performance based on the current and/or the current and previous communication sessions with the other participant. Alternately or additionally, the performance may be based on communication sessions that do not involve the user. For example, the performance may be based on one or more communication sessions of other users. In general, any description in this disclosure that relates to performance with respect to a user, performance with respect to one or more other users may be used in-place of the performance with respect to the user.

In some embodiments, when the performance is based on multiple previous communication sessions, the previous communication sessions may be weighted. For example, the previous communication session may be weighted by ½, with weights declining for additional communication sessions based on the occurrence of the additional communication sessions. Alternately or additionally, a decaying average may be used with respect to the multiple previous communication sessions. For example, suppose accuracy estimated for the current communication session is a0, accuracy for the previous communication session is a1, and for another previous communication session is a2, and the decaying average for the current communication session is d0, for the previous communication session is d1, and for the other previous communication session is d2. The decaying average d0 may be computed during or at the end of the current communication session as $d0=u*a0+(1-u)*d1$, where u is a decay rate, e.g., 0.1. Other formulations are possible such as $d0=u*a0+v*d1+w*d2$, where u, v, and w, are constants that control the rate and shape of the decay.

As noted, the performance of the transcription generation techniques may be based on a correction rate of the transcriptions. For example, a number of corrections and an age of the corrections may be determined. The age of the corrections may indicate how far in the past are the words when the corrections are made. In these and other embodiments, the performance measurement or estimate of a transcription generation technique may be increased or reduced for an increase in a number of corrections. Alternately or additionally, the age of the corrections may be weighted such that corrections that are greater in age may be weighted differently than corrections with smaller ages.

As noted, the performance of the transcription generation techniques may be based on an accuracy of the transcriptions. In some embodiments, the term "accuracy" may be used generically to refer to one or more metrics of a transcription or of the process of generating a transcription. For example, the term accuracy may represent one or more metrics including values or estimates for: accuracy, quality, error counts, accuracy percentages, error rates, error rate percentages, confidence, likelihood, likelihood ratio, log likelihood ratio, word score, phrase score, probability of an error, word probability, quality, and various other metrics related to transcriptions or the generation of transcriptions. Additionally, any of the above terms may be used in this disclosure interchangeably unless noted otherwise or understood from the context of the description. For example, an embodiment that describes the metric of confidence is used to make a decision may rely on other of the metrics described above to make the decision. Thus, the use of a specific term outside of the term accuracy should not be limiting, but rather as an example metric that may be used from multiple potential metrics.

For example, accuracy percentage of a transcription may equal accuracy of tokens in the transcription multiplied by 100% and divided by the number of tokens in the transcription. In these and other embodiments, the accuracy percentage may be 100% minus the percentage error rate. As another example, accuracy may equal one minus the error rate when error and accuracy are expressed in decimals. Thus, a description for estimating or utilizing one form of accuracy is to be understood to also be a description for estimating or utilizing another form of accuracy, since accuracy and error rates are merely different expressions of the same phenomenon. As another example, an agreement rate may be substantially equivalent to a disagreement rate and may be used for similar purposes, since they are complementary.

In some embodiments, the estimated or predicted accuracy may be based on past accuracy estimates. For example, past accuracy estimates may include the estimated and/or calculated accuracy for a previous period of time (e.g., for the past 1, 5, 10, 20, 30, or 60 seconds), since the beginning of the communication session, or during at least part of a previous communication session. In these and other embodiments, the predicted accuracy may be based on the past accuracy estimates. Alternatively or additionally, the predicted accuracy may be the past accuracy estimates. For example, if the past accuracy estimates an accuracy of 95%, the predicted accuracy going forward may equal the past accuracy estimates and may be 95%. Generally, when discussing an estimated or predicted accuracy in this disclosure, the estimated accuracy may be the past accuracy or may be a determination that is based on the past accuracy. Thus, the use of the term "estimate," "predict," "predicted," or "prediction" does not imply that additional calculations are performed with respect to previous estimates or determinations of accuracy. Additionally, the use of the term "predict," "predicted," or "prediction" with respect to any quantity, method, variable, or other element in this disclosure should be interpreted as discussed above and does not imply that additional calculations are performed to determine the prediction.

In some embodiments, the accuracy of a transcription generation technique may be estimated using one of multiple different methods. For example, accuracy of a transcription generation technique may be based on an estimated accuracy output (in the form of confidence scores or other metrics) from a speech recognition system. Alternately or additionally, transcriptions from one transcription generation technique may be compared to another transcription generation technique to determine agreement rates between the transcription generation technique. The agreement rates may be combined with each other and other features to estimate accuracy. The accuracy may be based on accuracy of the transcription generation technique with respect to accuracy of previous communication sessions for the user, across all users, during testing, and/or during other scenarios. As another example, with respect to the third speech recognition system 230, the accuracy may be average accuracy of transcription generated using a single participant or all participants that revoice audio. Alternately or additionally, the accuracy may be estimated using machine learning or regression to estimate the accuracy. Other methods of estimating accuracy are also described in U.S. patent application Ser. No. 16/209,623, filed on Dec. 4, 2018, entitled "Transcription Generation from Multiple Speech Recognition Systems," and incorporated herein in their entirety.

In some embodiments, the accuracy may be normalized based on an estimated difficulty of transcribing a communication session. A normalized accuracy may be determined as a ratio of an error rate divided by difficulty or as a difference of accuracy minus expected accuracy given the difficulty of the communication session. For example, a difficult communication session with low accuracy may receive a higher rating than an easy communication session with medium accuracy. Accuracy and difficulty may be estimated based on confidence scores from one or more speech recognizers, by comparing transcriptions generated by different transcription systems and counting the differences, among other estimation methods.

In some embodiments, the accuracy of transcription may be based on features of the audio. For example, voices in the audio with accents may reduce accuracy. Alternately or additionally, audio quality, such as noise level and distortion estimation, and/or packet loss may affect accuracy. Thus, the accuracy may be determined based on the features of the audio. For example, an average accuracy measurement of the transcription generation technique may be adjusted based on the features of the audio.

In some embodiments, actions by the user may be used to determine or adjust measured accuracy. For example, a volume level setting on a device broadcasting the audio may indicate how well a user is understanding during a communication session. Reduced understanding may indicate reduced accuracy of the transcription. Additional actions by a user may also indicate reduced accuracy of the transcription. For example, a confused look on the user's face or other visual evidence, as viewed from a camera, that the user does not understand what is said. As another example, adjustments the user makes to a hearing aid such as positioning it by hand, as seen by a camera, or a volume adjustment as detected electronically may indicate reduced accuracy of the transcription. As another example, a user rating provide with respect to a communication session may indicate an accuracy of a transcription.

In some embodiments, the transcription system 200 may monitor comparisons between performances of different transcription generation techniques. For example, the transcription system 200 may compare the performance of a first transcription generation technique to a second transcription generation technique. When a difference between the performance of the first and second transcription generation techniques satisfies a threshold, the transcription system 200 may generate a report to send to the user to obtain user input.

The performance of a transcription generation technique as indicated may be based on accuracy, latency, and/or word corrections. For example, the performance may be based solely on one of accuracy, latency, and word corrections. Alternately or additionally, the performance may be based on a combination of two or more of accuracy, latency, and word corrections. For example, the performance may be based on a combination of accuracy and latency. In these and other embodiments, the latency may increase as the accuracy increases and the latency may decrease as the accuracy decreases. As such the performance may be determined based on weighted combination of the accuracy and latency, where a solution, such as pareto optimal solution, may be determined that accounts for both accuracy and latency. In these and other embodiments, the performance may be based on a solution that helps to increase the understanding of a user being presented the transcription.

In some embodiments, the threshold, to which the difference between performances is compared, may be based on multiple variables. For example, the threshold may be based on the previous settings of a user and/or preferences of a user. For example, if a user prefers a first transcription generation technique, if the first transcription generation technique is selected, the threshold may be adjusted such that the performance of the second transcription generation technique is much larger than the performance of the first transcription generation technique before a report is generated regarding the performance of the transcription generation techniques. Alternately or additionally, a preference of a user may include an amount of latency and/or accuracy.

In some embodiments, the threshold may be dynamic and based on the current operation of the transcription system 200. For example, the threshold may be set based on an availability of different transcription generation techniques. For example, when fewer participants that revoice audio are available for the third speech recognition system 230, a threshold that may result in a recommendation for a user to select a third speech recognition system 230 may be higher than when more participants are available.

In some embodiments, the threshold may be adjusted based on other factors. For example, costs for a particular transcription generation technique may be a factor. The costs may be costs for the transcription system 200 and/or for the user. For example, if a first transcription generation technique is being used that costs more to operate than a second transcription generation technique, the threshold may be set such that as soon as the second transcription generation technique performance is better than the performance of the first transcription generation technique, a report may be generated regarding the performance of the transcription generation techniques.

In some embodiments, based on costs, preferences, financial or business priorities for a vendor providing a transcription service, previous settings, and/or other factors, a transcription generation technique may be favored over other transcription generation techniques. In these and other embodiments, the components of performance may be compared individually. In response to one component of a favored transcription generation technique satisfying a threshold, a report may be generated regarding the performance of the transcription generation techniques. For example, if accuracy of a disfavored transcription generation technique is better than the accuracy of the favored transcription generation technique but the latency of the favored transcription generation technique is better than the latency of the disfavored transcription generation technique, a report may be generated regarding the performance of the transcription generation techniques. In some embodiments, the report may refer to latency and may not refer to accuracy.

As discussed, in response to a comparison between transcription generation techniques, a report may be generated regarding the performance of the transcription generation techniques. The report may include information regarding the performance of the transcription generation techniques. Alternately or additionally, the report may include a recommendation regarding selection of one of the transcription generation techniques. The recommendation regarding selection of one of the transcription generation techniques may include changing the transcription generation technique for the current communication session, changing the transcription generation technique for the current and future communication sessions, or changing the transcription generation technique for future communication sessions.

In some embodiments, the information included in the report may provide the performance for each of the transcription generation techniques. Alternately or additionally, the information may provide the performance of the transcription generation technique recommended for selection. Alternately or additionally, the information may provide information regarding a comparison of the performance for each of the transcription generation techniques. Alternately or additionally, the information may include statistics for individual components of the performance, such as accuracy, latency, etc.

Alternately or additionally, the information may be a representation of the performance of the transcription generation techniques. For example, the information may include a star ranking system, an icon like a smiley face or frown face, or a color that represents good and bad, among other representations.

Alternately or additionally, the information may include transcriptions from the transcription generation techniques. In some embodiments, the transcriptions may be displayed next to each other. In these and other embodiments, differences between the transcriptions may be highlighted. Additional information regarding the performance of each of the transcriptions may also be provided.

In some embodiments, the recommendation may be based on performance and comparisons of the selected transcription generation technique and the other transcription generation techniques. For example, the recommendation may suggest that the user select one transcription generation technique in place of another. In these and other embodiments, the recommendation may indicate an advantage of switching transcription generation techniques, such as an increase in accuracy or a reduction in latency. Alternately or additionally, the recommendation may indicate a benefit of particular transcription generation techniques, such as the transcription generation techniques performed by the first speech recognition system 210 being private and not revoiced as compared to the transcription generation techniques performed by the third speech recognition system 230. As another example, the recommendation may indicate the benefit of reducing costs or latency by switching.

In some embodiments, a recommendation may not include information, such as the performances and/or performance comparisons. For example, the recommendation may not provide quantitative information, but may recommend or ask if a user would like to switch to another transcription generation technique. In these and other embodiments, the recommendation or question may not indicate that the user is switching between transcription generation techniques.

In some embodiments, the information and/or the recommendation may be provided with respect to individual users that participate in communication sessions with the user. For example, for each communications session, the report may provide information and/or a recommendation. Alternately or additionally, the report may provide information and/or a recommendation for each contact in a contact list of the user. In these and other embodiments, the report may indicate a selected transcription generation technique for communication sessions with the contact and suggest another transcription generation technique for future communication sessions with the contact.

In some embodiments, the recommendation may provide a mechanism for the user to select a different transcription generation technique. For example, the recommendation may include a button to allow a user to select a different transcription generation technique. Alternately or additionally, the recommendation may provide instructions for the user to select a transcription generation technique, such as being navigating to a menu or some other location in a user interface. Additional options that may be provided by the report to the user may include "select the transcription generation technique that is working best," "select the better of these two options," or "select between automatic and revoicing," among others. The set of available options presented for the user to select may include a subset of all possible options and the subset presented may be responsive to estimated transcription performance and/or one or more performance comparisons.

After generation, the report may be provided to the user. In some embodiments, the report may be provided to a device used by the user for communication sessions. For example, the report may be available in the settings of the device or presented on a home screen of a user interface of the device. Alternately or additionally, the report may be available on a webpage that the user may access via a browser. Alternately or additionally, the report may be orally communicated to the user via a communication session.

In some embodiments, the report may be provided to a user in response to the difference between performances of the transcription generation techniques satisfying a threshold. In these and other embodiments, one or more additional factors may also be considered in combination with the satisfaction of the threshold. The additional factors may be a timing criteria or other criteria as determined by a machine learning algorithm. The additional timing criteria may include sending a report when a device is installed that may present transcriptions, during interactions by the user with the device, before a communication session, at an end of a communication session, during a communication, or at some other time. For example, a report may be provided on a regular basis, such as monthly, quarterly, or at some other interval.

As described the user may provide input in response to the report. For example, a device used by the user to view the presentations of the transcription may display the report and/or provide a user interface for obtaining input from the user. In these and other embodiments, the user input may be obtained through a touchscreen or other user interface, such as buttons on the device, gestures captured by a camera, and/or voice captured by a speaker. Alternately or additionally, a user may provide the input through a browser interface on a device not being used for the communication. Alternately or additionally, the input may be collected verbally through another communication session.

The input from the user may be provided to the transcription system 200. In response to and based on the input from the user, the transcription system 200 may take one or more actions. For example, the transcription system 200 may adjust the speech recognition system that is generating the transcriptions. For example, the transcription system 200 may select a different one of the first speech recognition system 210, the second speech recognition system 220, and third speech recognition system 230 to perform transcriptions. Alternately or additionally, the transcription system 200 may adjust the transcription generation technique used by one of the speech recognition systems. Alternately or additionally, the transcription system 200 may combine transcriptions from one or more of the speech recognition systems or transcription generation techniques.

In some embodiments, the transcription system 200 may adjust the transcription generation technique by adjusting a speed of the automatic speech recognition performed by the speech recognition system. Adjusting the speed of the automatic speech recognition may adjust an amount of latency and/or resources used by the transcription system 200. To adjust the speed of the automatic speech recognition, runtime parameters such as beam width, relative weighting between an acoustic model and a language model, and the number of recognition results combined together may be adjusted. Alternately or additionally, a number of parts of a model of the automatic speech recognition may be adjusted to adjust a speed. Alternately or additionally, different models within the speech recognition system may be used to adjust a speed, such as using models with fewer n-grams, shorter n-grams, fewer DNN nodes or connections, among other types of changes to models.

In some embodiments, the transcription system 200 may change the transcription generation technique based on the user input. However, in response to the selected transcription generation technique not being available, the transcription system 200 may change to another transcription generation technique. In some embodiments, the change to the transcription generation technique may be implemented through a user interface on the device. In these and other embodiments, someone may assist the user in making the changes through network connection to the device or through an in-person visit to the user.

As a result of changing a transcription generation technique, a cost may change. In these and other embodiments, a final charge may be associated with the different transcription generation techniques used for the communication sessions participated in by the user.

In some embodiments, the transcription system 200 may make decisions regarding generating a report and the information to include in the report based on one or more of the factors described in this disclosure. For example, the comparison of performances between transcription generation techniques along with other factors discussed above may be used to determine when to generate a report. Alternately or additionally, factors other than the comparison of performances between transcription generation techniques may be used to determine when to generate a report.

In these and other embodiments, the transcription system 200 may implement algorithms to assist making decisions. For example, the transcription system 200 may use machine learning algorithms to assist in making decisions based on one or more of the factors discussed in this disclosure. Algorithms that may be used include neural nets, support vector machines, random forest, linear discriminators and classifiers, and logistic regression, among others.

Modifications, additions, or omissions may be made to the transcription system 200 without departing from the scope of the present disclosure. For example, in some embodiments, in response to a user selection, the transcription system 200 may take additional actions such as refer a user to a different transcription system, display an advertisement, offer a coupon or discount and/or fulfill a purchase, or perform other virtual assistant functions such as provide news, weather, reminders, phone messages, thought for the day, horoscope, medication reminder, browse websites, ask survey questions and collect user responses, or send a message to a loved one, among other actions.

In some embodiments, the transcription system 200 may provide a user with an ability to select between participants that perform the revoicing of audio in the third speech recognition system 230. For example, a user may request a participant for revoicing or request that a participant not perform revoicing.

In some embodiments, the transcription system 200 may be further configured to present the performance of a transcription to a participant of the third speech recognition system 230. The performance presented to the participant may indicate how well the participant is performing with respect to other participants.

In some embodiments, the transcription system 200 may further consider input from a participant of the third speech recognition system 230 when generating a report for a user. Alternatively or additionally, the transcription system 200 may provide the report and/or consider input from another user participating in a communication session, such as the second user 112 of FIG. 2.

As another example, the performance of a single transcription generation technique may be compared to a threshold. The threshold may be selected based on a performance of another transcription generation technique. In these and other embodiments, a report may be generated in response to the performance satisfying the threshold that may be provided to the user.

As another example, the transcription system 200, based on a comparison of the performance of the transcription generation techniques, may select a different transcription generation technique without input from a user. In these and other embodiments, the transcription system 200 may provide an indication to the user of a change in the transcription generation technique and/or a mechanism for the user to provide input or change the transcription generation technique. For example, the transcription system 200 may send a message advising the user that the transcription generation technique has been switched from a transcription technique that uses revoicing to a transcription generation technique that does not or vice versa. The message may advise the user of an identifier of a person providing revoicing before and/or after the change.

As another example, the transcription system 200 may generate a report without comparing performances of transcription generation techniques. In these and other embodiments, the transcription system 200 may obtain information regarding selection of one or more transcription generation techniques and generate a report regarding the selection. Based on user input, the transcription system 200 may adjust the transcription generation technique. In these and other embodiments, the information may relate to costs, preferences, financial or business priorities for a vendor providing a transcription service, previous settings, and/or other factors for which a transcription generation technique may be favored over other transcription generation techniques.

Figure 3:
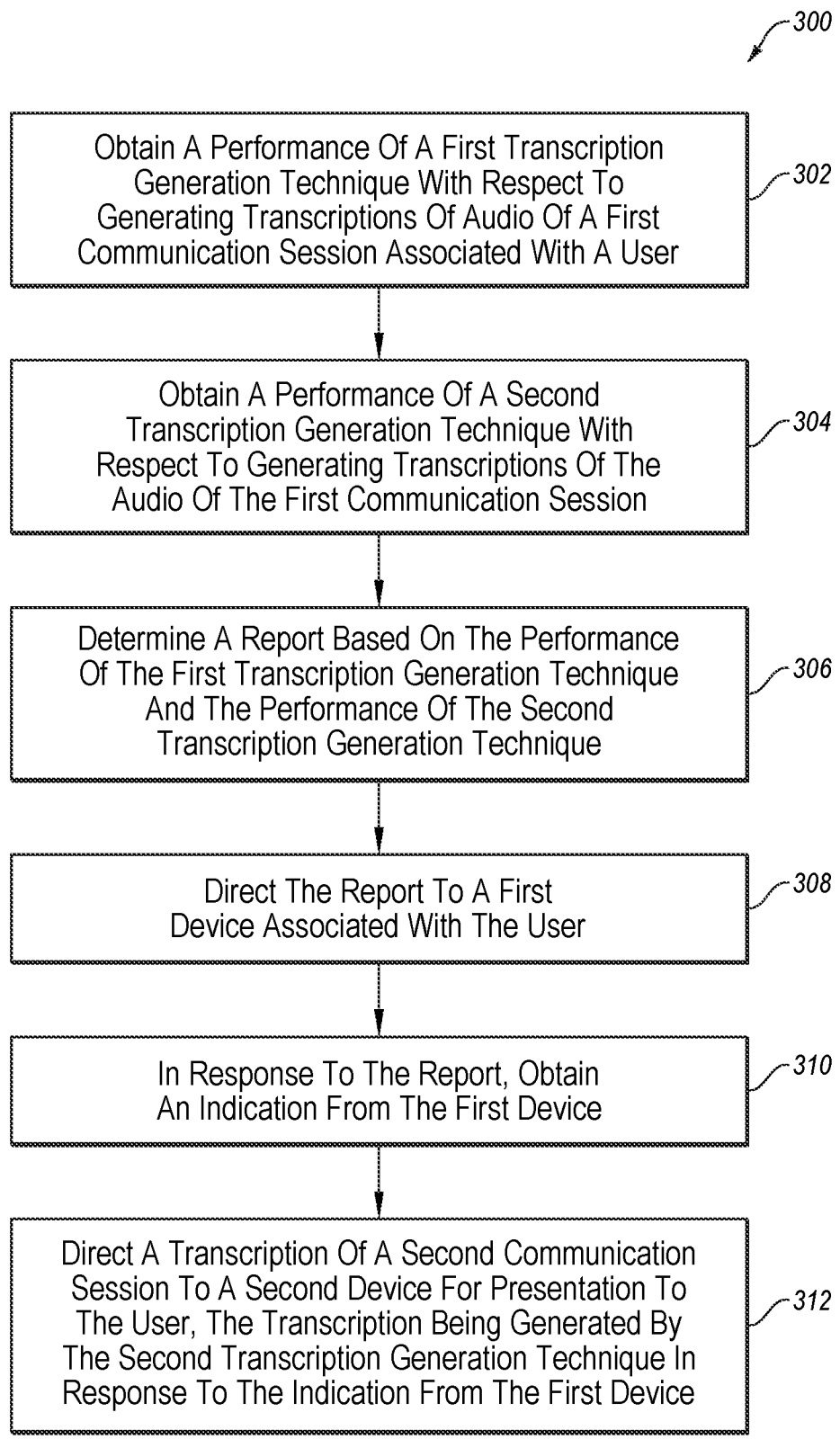
FIG. 3 illustrates a flowchart of an example method to select a transcription generation technique.

FIG. 3 illustrates a flowchart of an example method 300 to select a transcription generation technique. The method 300 may be arranged in accordance with at least one embodiment described in the present disclosure. One or more operations of the method 300 may be performed, in some embodiments, by a device or system, such as the transcription system 130 and/or the transcription system 200 of FIGS. 1 and 2 or another device or combination of devices. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where a performance of a first transcription generation technique with respect to generating transcriptions of audio of a first communication session associated with a user may be obtained.

At block 304, a performance of a second transcription generation technique with respect to generating transcriptions of the audio of the first communication session may be obtained. In some embodiments, the performance of the second transcription generation technique may be based on one or more of the following: transcription accuracy, transcription latency, and number of transcription corrections. In these and other embodiments, the performance of the second transcription generation technique may be based on multiple communications sessions that include the first communication session.

At block 306, a report may be determined based on the performance of the first transcription generation technique and the performance of the second transcription generation technique. In some embodiments, one of the first transcription generation technique and the second transcription generation technique may include a revoicing of audio before transcription generation.

At block 308, the report may be directed to a first device associated with the user. In some embodiments, the report may include a recommendation for the second transcription generation technique and the indication may include a selection of the second transcription generation technique. At block 310, in response to the report, an indication from the first device may be obtained.

At block 312, a transcription of a second communication session may be directed to a second device for presentation to the user. In these and other embodiments, the transcription may be generated by the second transcription generation technique in response to the indication from the first device. Alternately or additionally, the first device and the second device may be the same device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may further include before determining the report, directing a second transcription of the first communication session that involves the second device to the second device. In these and other embodiments, the second transcription may be generated by the first transcription generation technique. Alternately or additionally, the steps of directing the report and of obtaining the indication may occur during the first communication session. In these and other embodiments, the first communication session and the second communication session may be the same communication session.

Figure 4:
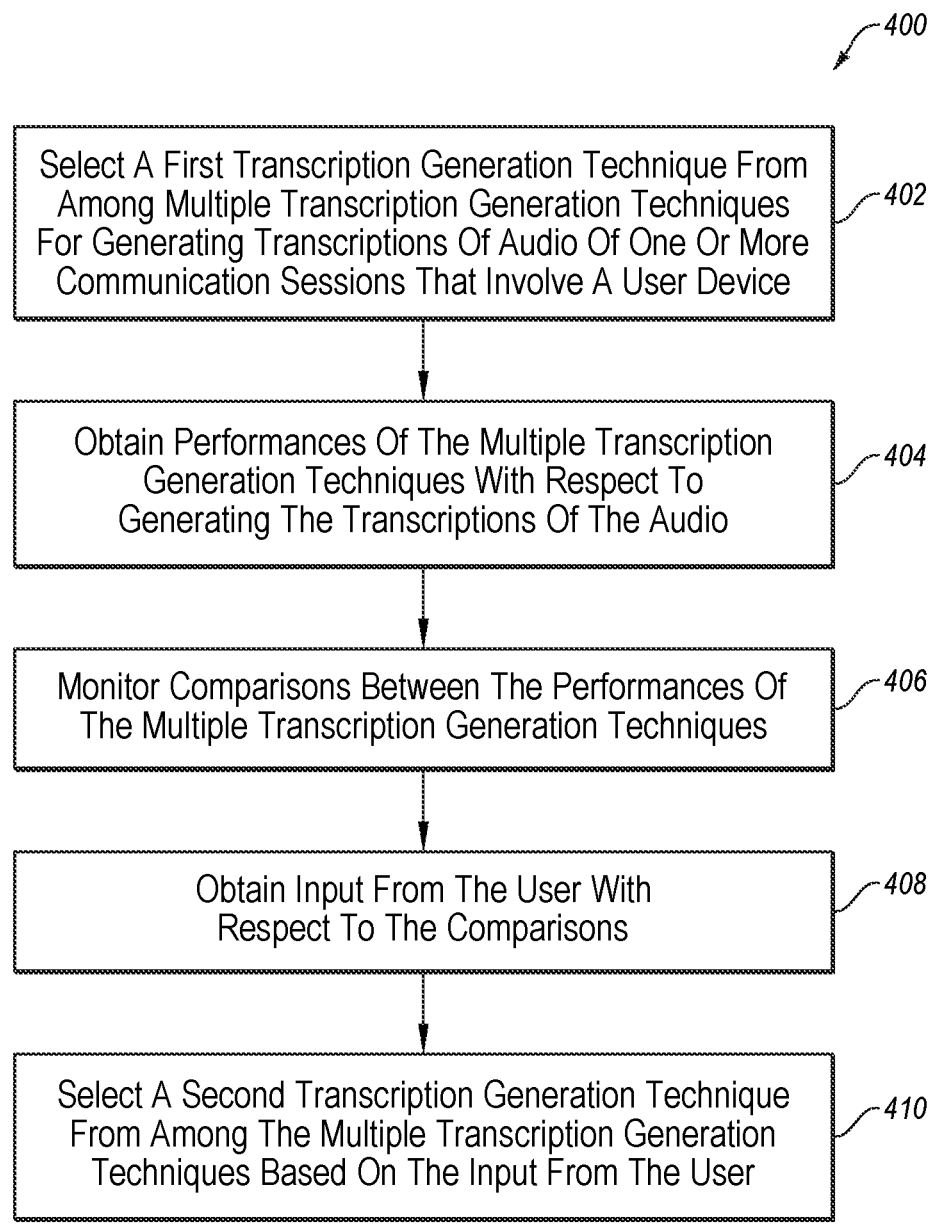
FIG. 4 illustrates a flowchart of another example method to select a transcription generation technique.

FIG. 4 illustrates a flowchart of an example method 400 to select a transcription generation technique. The method 400 may be arranged in accordance with at least one embodiment described in the present disclosure. One or more operations of the method 400 may be performed, in some embodiments, by a device or system, such as the transcription system 130 and/or the transcription system 200 of FIGS. 1 and 2 or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a first transcription generation technique may be selected from among multiple transcription generation techniques for generating transcriptions of audio of one or more communication sessions that involve a user device. In some embodiments, the selection of the first transcription generation technique may be based on the performance of the first transcription generation technique.

At block 404, performances of the multiple transcription generation techniques with respect to generating the transcriptions of the audio may be obtained. In some embodiments, the performances of the multiple transcription generation techniques may be based on one or more of the following: transcription accuracy and transcription latency.

At block 406, comparisons between the performances of the multiple transcription generation techniques may be monitored. At block 408, input from the user with respect to the comparisons may be obtained.

At block 410, a second transcription generation technique may be selected from among the multiple transcription generation techniques based on the input from the user. In some embodiments, the second transcription generation technique may not generate a transcription of the audio such that the performance of the second transcription generation technique is an estimated performance. Alternately or additionally, the second transcription generation technique may generate a transcription of the audio such that the performance of the second transcription generation technique may be determined from the output of the second transcription generation technique. The performance may be determined based on one or more of the following confidence scores of the second transcription generation technique, the transcription of the second transcription generation technique, comparison of the transcription to that of other transcription generation techniques, among other outputs.

In some embodiments, monitoring comparisons between the performances of the multiple transcription generation techniques may occur with respect to a first communication session that involves the user device. In these and other embodiments, the second transcription generation technique may be selected to generate transcriptions of audio for a second communication session that involves the user device and that occurs after the first communication session. Alternately or additionally, the second transcription generation technique may be selected to generate transcriptions of audio of the first communication session during the first communication session.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include directing a report to the user based on the comparison. In these and other embodiments, the input may be obtained in response to report.

Figure 5:
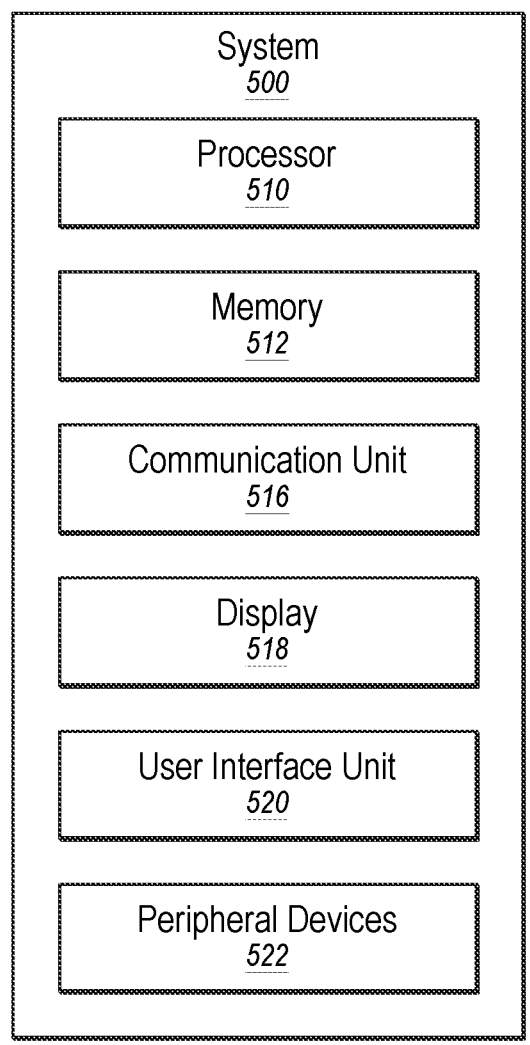
FIG. 5 illustrates an example system that may be used during transcription of communications.

FIG. 5 illustrates an example system 500 that may be used during transcription of communications. The system 500 may be arranged in accordance with at least one embodiment described in the present disclosure. The system 500 may include a processor 510, memory 512, a communication unit 516, a display 518, a user interface unit 520, and a peripheral device 522, which all may be communicatively coupled. In some embodiments, the system 500 may be part of any of the systems or devices described in this disclosure.

For example, the system 500 may be part of the first device 104 of FIG. 1 and may be configured to perform one or more of the tasks described above with respect to the first device 104. As another example, the system 500 may be part of the second device 106 of FIG. 1 and may be configured to perform one or more of the tasks described above with respect to the second device 106. As another example, the system 500 may be part of the transcription system 130 of FIG. 1 and may be configured to perform one or more of the tasks described above with respect to the transcription system 130.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to selecting a transcription generation technique for a communication session such that the system 500 may perform or direct the performance of the operations associated therewith as directed by the instructions. In these and other embodiments, the instructions may be used to perform one or more operations of the method 300 or the method 400 of FIGS. 3 and 4.

The memory 512 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 516 may permit data to be exchanged with a network and/or any other devices or systems described in the present disclosure. For example, when the system 500 is included in the first device 104 of FIG. 1, the communication unit 516 may allow the first device 104 to communicate with the transcription system 130.

The display 518 may be configured as one or more displays, like an LCD, LED, Braille terminal, or other type of display. The display 518 may be configured to present video, text captions, user interfaces, and other data as directed by the processor 510. For example, when the system 500 is included in the first device 104 of FIG. 1, the display 518 may be configured to present second video from a second device, a transcript of second audio from the second device, and/or a report.

The user interface unit 520 may include any device to allow a user to interface with the system 500. For example, the user interface unit 520 may include a mouse, a track pad, a keyboard, buttons, camera, and/or a touchscreen, among other devices. The user interface unit 520 may receive input from a user and provide the input to the processor 510. In some embodiments, the user interface unit 520 and the display 518 may be combined.

The peripheral devices 522 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 500 or otherwise generated by the system 500.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 500 may not include one or more of the components illustrated and described.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 512 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method to transcribe communications, the method comprising:
   obtaining a performance of at least one of a plurality of transcription generation techniques with respect to generating transcriptions of audio;
   determining a report based on the performance of the at least one of the plurality of transcription generation techniques, wherein the performance of the at least one of the plurality of transcription generation techniques is based on one or more of the following: transcription accuracy and transcription latency;
   directing the report to a device that obtains transcriptions of a first audio session involving the device using one of the plurality of transcription generation techniques, the performance of the at least one of the plurality of transcription generation techniques is based on the transcriptions of the first audio session;
   after directing the report, obtaining an indication from the device; and
   selecting, based on the indication from the device, another one of the plurality of transcription generation techniques to generate transcriptions of a future audio session involving the device that occurs after the first audio session.

2. The method of claim 1, wherein the report includes a recommendation for the other one of the plurality of transcription generation techniques and the indication includes a selection of the other one of the plurality of transcription generation techniques.

3. The method of claim 2, further comprising determining the recommendation based on a cost associated with the one of the plurality of transcription generation techniques and a cost associated with the other one of the plurality of transcription generation techniques.

4. The method of claim 1, wherein the steps of directing the report and of obtaining the indication occur during the first audio session.

5. The method of claim 1, further comprising:
   obtaining a performance of the other one of the plurality of transcription generation techniques with respect to generating transcriptions of audio; and
   comparing the performance of the other one of the plurality of transcription generation techniques and the performance of the at least one of the plurality of transcription generation techniques, wherein the report is based on the comparison.

6. The method of claim 5, wherein comparing the performance of the other one of the plurality of transcription generation techniques and the performance of the at least one of the plurality of transcription generation techniques includes comparing two or more aspects of the performance of the other one of the plurality of transcription generation techniques with two or more aspects of the performance of the at least one of the plurality of transcription generation techniques, wherein the report includes aspects of the performance of the other one of the plurality of transcription generation techniques that are better than aspects of the performance of the at least one of the plurality of transcription generation techniques.

7. The method of claim 1, wherein one of the plurality of transcription generation techniques includes a revoicing of audio before transcription generation.

8. At least one non-transitory computer-readable media configured to store one or more instructions that when executed by at least one processor cause or direct a system to perform the method of claim 1.

9. A method to transcribe communications, the method comprising:

selecting a first transcription generation technique from among a plurality of transcription generation techniques for generating transcriptions of audio obtained by a device during a first audio session;

obtaining a performance of at least one of the plurality of transcription generation techniques with respect to generating transcriptions;

after presentation of the transcriptions of the audio by the device, obtaining input from a user of the device regarding the performance of at least one of the plurality of transcription generation techniques with respect to generating transcriptions of the first audio session; and selecting a second transcription generation technique from among the plurality of transcription generation techniques in response to the input from the device for a second audio session that occurs after the first audio session, the second transcription generation technique being used for generating transcriptions of second audio obtained by the device during the second audio session.

10. The method of claim 9, wherein the performance of the at least one of the plurality of transcription generation techniques is based on one or more of: transcription accuracy and transcription latency.

11. The method of claim 9, wherein the performance of the at least one of the plurality of transcription generation techniques is measured without consideration of the transcriptions generated during the first audio session.

12. The method of claim 9, wherein the selection of the first transcription generation technique occurs before the second audio session begins.

13. The method of claim 9, wherein the performance of the at least one of the plurality of transcription generation techniques is the performance of the first transcription generation technique, the method further comprising:

obtaining performance of the second transcription generation technique with respect to generating transcriptions; and before obtaining the input from the device, providing a report to the device based on a comparison between the performance of the first transcription generation technique and the performance of the second transcription generation technique.

14. The method of claim 13, further comprising:

determining an aspect of the performance of the second transcription generation technique that is better than a same aspect of the performance of the first transcription generation technique; and generating the report to include the aspect of the performance of the second transcription generation technique.

15. The method of claim 13, wherein the second transcription generation technique does not generate a transcription of audio such that the performance of the second transcription generation technique is an estimated performance.

16. The method of claim 9, wherein the performance of at least one of the plurality of transcription generation techniques is the performance of the second transcription generation technique.

17. At least one non-transitory computer-readable media configured to store one or more instructions that when executed by at least one processor cause or direct a system to perform the method of claim 9.

18. A system comprising:

one or more processors; and one or more non-transitory computer-readable mediums configured to store instructions that when executed by the processors cause or direct the system to perform operations, the operations comprising:

obtaining a performance of at least one of a plurality of transcription generation techniques with respect to generating transcriptions of audio;

determining a report based on the performance of the at least one of the plurality of transcription generation techniques, wherein the performance of the at least one of the plurality of transcription generation techniques is based on one or more of the following: transcription accuracy and transcription latency;

directing the report to a device that obtains transcriptions of a first audio session involving the device using one of the plurality of transcription generation techniques, the performance of the at least one of the plurality of transcription generation techniques is based on the transcriptions of the first audio session;

after directing the report, obtaining an indication from the device; and selecting, based on the indication from the device, another one of the plurality of transcription generation techniques to generate transcriptions of a future audio session involving the device that occurs after the first audio session.

19. A method to transcribe communications, the method comprising:

obtaining a performance of at least one of a plurality of transcription generation techniques with respect to generating transcriptions of audio;

determining a report based on the performance of the at least one of the plurality of transcription generation techniques, wherein the performance of the at least one of the plurality of transcription generation techniques is based on one or more of the following: transcription accuracy and transcription latency;

directing the report to a device that obtains transcriptions of a first audio session involving the device using one of the plurality of transcription generation techniques, the performance of the at least one of the plurality of transcription generation techniques is based on the transcriptions of the first audio session;

after directing the report, obtaining an indication from the device; and selecting, based on the indication from the device, another one of the plurality of transcription generation techniques to generate transcriptions of a future audio session involving the device that occurs after the first audio session.

20. The method of claim 19, wherein the report includes a recommendation for the other one of the plurality of transcription generation techniques and the indication includes a selection of the other one of the plurality of transcription generation techniques.

\* \* \* \* \*